United States Patent [19]

Sarumaru

[11] Patent Number: 4,525,320
[45] Date of Patent: Jun. 25, 1985

[54] METHOD OF PREHEATING AND PREFORMING A GREEN TIRE

[76] Inventor: Kazumasa Sarumaru, 8-27 Kinmitsu-cho, Ashiya 659, Japan

[21] Appl. No.: 581,692

[22] Filed: Feb. 21, 1984

[30] Foreign Application Priority Data

May 30, 1983 [JP] Japan ................. 58-95519

[51] Int. Cl.³ .............. B29H 5/02; B29H 17/26
[52] U.S. Cl. .................. 264/502; 264/519; 264/315; 264/326; 425/31; 425/42
[58] Field of Search .......... 264/501, 502, 315, 326, 264/519; 425/31, 40, 41, 42

[56] References Cited

U.S. PATENT DOCUMENTS 3,793,420  2/1974  Fredricks et al.
3,903,227  9/1975  Sarumaru
3,924,981  12/1975  Sarumaru

FOREIGN PATENT DOCUMENTS 1952439  4/1970  Fed. Rep. of Germany
2161939  6/1973  Fed. Rep. of Germany
454829  10/1936  United Kingdom ............ 425/28 R Primary Examiner—Jan Silbaugh
Attorney, Agent, or Firm—Marshall, O'Toole, Gerstein, Murray & Bicknell

[57] ABSTRACT

This disclosure relates to a method for preheating and preforming a green tire prior to final vulcanization of the tire. The method includes the steps of supporting the beads of a green tire between a pair of relatively cool discs to form a tightly closed space, moving the discs toward each other until the tire has a shape substantially the same as the final tire shape, supplying the space with a thermal medium, and heating the medium and the tire to a temperature substantially lower than that at which the vulcanization starts but high enough to preform the tire. A coolant is passed through the parts of the discs which engage the tire beads to prevent overheating of the beads.

6 Claims, 2 Drawing Figures

METHOD OF PREHEATING AND PREFORMING A GREEN TIRE

This invention relates to vulcanization of a green tire by the direct action of a heated pressure medium within the tire.

BACKGROUND OF THE INVENTION

This inventor's U.S. Pat. No. 3,903,227, dated Sept. 2, 1975, shows a vulcanization system of this nature wherein a tire is placed within a pair of dies, the dies are closed, a tightly closed space thus being formed including the interior of the tire, the space is directly supplied with a pressure medium, and the medium is heated by means provided in the space.

During such vulcanization, a problem arises at an initial stage in the process, because a green tire is placed within the dies soon after a previous vulcanized tire is removed from the dies. The problem may be described as follows.

At the time when a green tire is placed within the widely opened dies, the tire itself is also spread open and the beads are spaced far apart; also the tire is relatively stiff at the ambient (low) temperature. The dies which were heated by the previous vulcanization cycle are then closed on the tire while they are hot. Immediately after the dies start to close, the bead seats of the dies engage the tire beads, thereby compressing the beads axially toward each other against the rigidity of the tire, and the tire tread is expanded outwardly. During the closing movement of the dies until the tread compressively engages the interior die surfaces, the tire bead surfaces rub with a considerable pressure against the hot bead seats of the dies. This heated rubbing and pressure may cause local release and/or failure of the surface rubber layer forming the tire beads.

Another problem is that it takes a relatively long time to complete the vulcanization of a tire when it is placed at the ambient temperature within the dies and then heated to a predetermined temperature, because the tire consists of a rubber material which has poor heat transfer characteristics.

It is a general object of this invention to provide a novel method of preheating and preforming a green tire to facilitate the subsequent vulcanization of the tire.

SUMMARY OF THE INVENTION

A method according to this invention includes the steps of supporting the beads of a green tire between a pair of relatively cool discs to form a tightly closed space, moving the discs toward each other until the tire has a shape substantially the same as the final tire shape, supplying the space with a thermal medium, and heating the medium and the tire to a temperature substantially lower than that at which the vulcanization starts but high enough to preform the tire.

BRIEF DESCRIPTION OF THE DRAWINGS

A preferred embodiment of this invention is shown in the accompanying drawings, wherein.

DETAILED DESCRIPTION OF THE DRAWINGS

Figure 1:
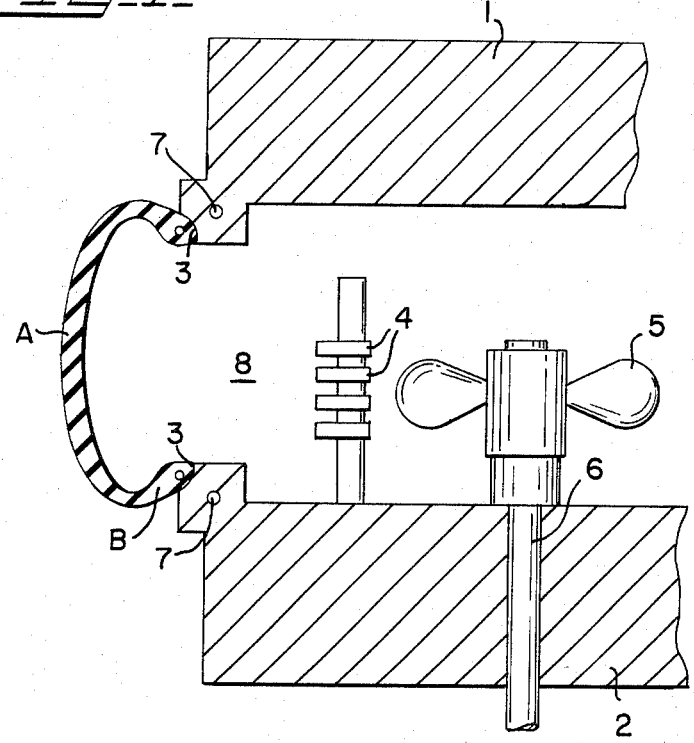
FIG. 1 is a fragmentary view in axial section of a tire preheater for use in the method according to this invention.

With reference to the drawings, the tire preheater includes a pair of upper and lower discs 1 and 2 which are axially movable toward and away from each other by a conventional drive means (not shown). Each disc 1 and 2 is formed with a peripheral bead seat 3 therein adjacent its axially inner end, and a coolant passage 7 is formed therein adjacent each seat 3.

Electric heaters 4 and a fan 5 are mounted on the upper (or inner) side of lower disc 2, under the upper disc 1. The heaters 4 are insulated electrically and thermally from the disc 2, and are connected to a temperature control switch for maintaining the interior heated air (the thermal medium) at a constant preset temperature. The fan 5 may be driven through a shaft 6 to circulate the interior air which is heated by the heaters 4.

Figure 2:
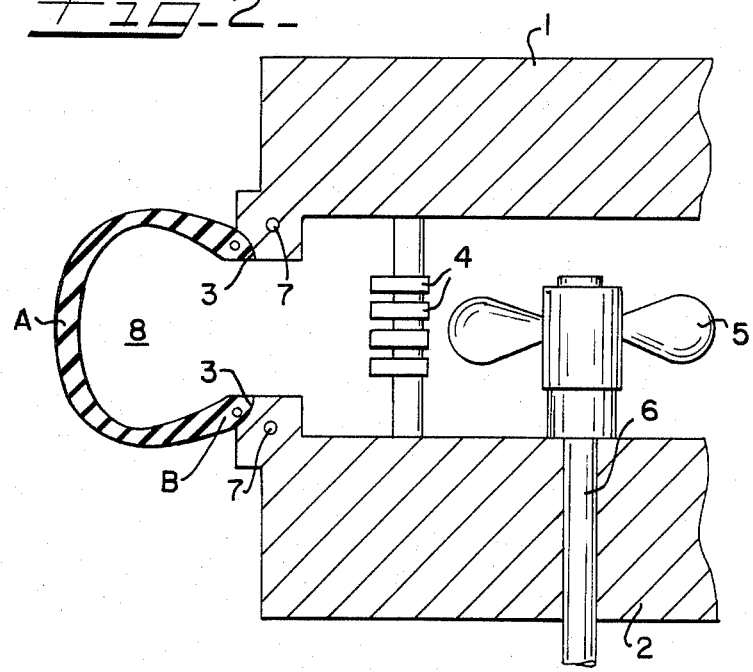
FIG. 2 is a view similar to FIG. 1, but showing the preheater in another position.

In operation, the dies are at nearly ambient temperature, or slightly above ambient, and they are initially spaced apart as shown in FIG. 1. A green tire A at ambient temperature is then placed in and held in place between the wide open discs 1 and 2. As the discs are closed, the seats 3 engage the tire beads B (FIG. 1), thereby forming a closed space 8 between the discs 1 and 2 and within the tire A. When the discs reach the closed position (FIG. 2), the tire is axially compressed and the tire is formed into substantially the final shape (FIG. 2) for vulcanization.

The thus tightly closed space 8 is then fed with air under pressure by a conventional air compressor and tube (not shown) connected to the space 8, so that the pressure in the space 8 is increased to 1.1–1.5 kg/cm$^2$, for example, which is slightly higher than the atmospheric pressure. The heaters 4 and the fan 5 are then energized to circulate the air and to heat the tire A gradually from the inside to a temperature of the order of 100° C., for example, which is much lower than the initial vulcanizing temperature. During this heating step, cooling water is passed through the passages 7 as necessary to keep the bead seats 3 cooler than the temperature of the heated air and the tire. Because of the relatively cool bead seats 3, the tire beads B are not affected thermally in a detrimental manner.

The discs 1 and 2 are then opened to a wider position, than that shown in FIG. 1, to remove the preheated tire A. Because of the preheat to approximately 100° C., the removed tire does not return to its initial shape (shown in FIG. 1), but maintains a shape similar to the final tire shape (shown in FIG. 2), ready for final vulcanization/formation within a pair of dies by conventional means. The final vulcanization may be made at a high temperature of 180°–200° C. and at a high pressure of 20 kg/cm$^2$, for example, in the closed space within the tire and between the dies.

In summary, this invention is characterized by preheating a green tire as a whole as depressed into the shape for vulcanization, before vulcanizing/forming the tire by placing the tire within a pair of vulcanizing dies to form a tightly closed space including the tire interior, allowing a pressure medium to act directly in the space and heating it.

Thus, when placed within the final vulcanization dies, the preheated tire has a preshape similar to the final tire shape. This shortens the die stroke, and also substantially eliminates rubbing under heat and pressure between the bead seats and the tire beads. As a result, even if the bead seats are hot, there is little likelihood of failure in the tire bead surfaces. Because the preheated tire has a considerable amount of heat when it is placed within the dies and vulcanized, the vulcanizing time is thereby reduced. The tire is preferably preheated immediately before vulcanization, thereby eliminating time losses.

What is claimed is:

1. A method of preheating and preforming a green tire before final vulcanization, utilizing a pair of generally circular axially movable discs, said method comprising the steps of supporting the tire beads between said pair of discs to form a tightly closed interior space, moving said discs toward each other and thereby axially compressing the tire until the tire has a shape substantially the same as the final tire shape, supplying said interior space with a thermal medium, heating said medium and said tire to a preheat temperature which is substantially lower than the temperature at which the final vulcanization starts, and removing said tire from said discs while at said preheat temperature.

2. A method according to claim 1, and further comprising the step of stirring said heated thermal medium in said space.

3. A method according to claim 1, wherein said preheat temperature is approximately 100° C.

4. A method according to claim 1, wherein said thermal medium is under pressure during said preheating.

5. A method according to claim 1, and further including the step of placing said tire while substantially at said preheat temperature in a final vulcanizing apparatus and vulcanizing said tire.

6. A method according to claim 1, and further including the step of cooling the portions of said discs that engage the tire beads while said tire is being preheated.

* * * * *